United States Patent
Iwamoto

(10) Patent No.: US 10,452,323 B2
(45) Date of Patent: Oct. 22, 2019

(54) METHOD, PRINTER, AND COMPUTER-READABLE MEDIUM FOR PRINTING WITH USER-SPECIFIED AND PREDEFINED SETTINGS

(71) Applicant: KONICA MINOLTA LABORATORY U.S.A., INC., San Mateo, CA (US)

(72) Inventor: Shohei Iwamoto, San Mateo, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 15/934,033

(22) Filed: Mar. 23, 2018

(65) Prior Publication Data
US 2019/0294386 A1  Sep. 26, 2019

(51) Int. Cl.
*G06F 3/12* (2006.01)

(52) U.S. Cl.
CPC .......... *G06F 3/1204* (2013.01); *G06F 3/1254* (2013.01); *G06F 3/1257* (2013.01); *G06F 3/1258* (2013.01)

(58) Field of Classification Search
CPC .................................................. G06F 3/1204
USPC ......................................................... 358/1.15
See application file for complete search history.

(56) References Cited

U.S. PATENT DOCUMENTS

| | | | | |
|---|---|---|---|---|
| 2002/0035941 A1* | 3/2002 | Nakao | ................... | G06F 3/1204 101/484 |
| 2006/0070070 A1* | 3/2006 | Iwamoto | ............... | G06F 21/608 718/100 |
| 2008/0144087 A1* | 6/2008 | Mitsui | ................... | G06F 3/1204 358/1.15 |
| 2015/0268911 A1* | 9/2015 | Sato | ...................... | G06F 3/1292 358/1.14 |

* cited by examiner

*Primary Examiner* — Jacky X Zheng
(74) *Attorney, Agent, or Firm* — Squire Patton Boggs (US) LLP

(57) ABSTRACT

In a printing method, a plurality of predefined print setting groups are stored by a printer. A client device sends a print job to the printer. For the print job, the printer receives user-specified print settings that can be set with a graphic user interface on the client device. The printer also receives a shortcut ID, which the printer associates with one of the predefined print setting groups. The print job is completed using a merged group of settings derived from the user-specified and predefined settings. Advantageously, the predefined settings may be of a type that a user cannot set from the client device, as might be the case when the client device is physically small with a minimal graphic user interface. This can allow the user to access more sophisticated features of the printer. However, conflicts may arise between the user-specified and predefined settings. The printer resolves conflicts by giving priority to user-specified settings or predefined settings.

21 Claims, 19 Drawing Sheets

PRINT SETTINGS ACCEPTED BY PRINTER

| Type | Print Settings | | | | | |
|---|---|---|---|---|---|---|
| 1 paper size | 1-a | 1-b | 1-c | 1-d | 1-e | 1-f |
| 2 two-sided | 2-a | 2-b | 2-c | | | |
| 3 | 3-a | 3-b | | | | |
| 4 orientation | 4-a | 4-b | 4-c | 4-d | | |
| 5 | 5-a | 5-b | 5-c | | | |
| 6 | 6-a | 6-b | 6-c | 6-d | 6-e | |
| 7 color mode | 7-a | 7-b | | | | |
| 8 | 8-a | 8-b | | | | |
| 9 | 9-a | 9-b | 9-c | 9-d | | |
| 10 | 10-a | 10-b | 10-c | 10-d | | |
| 11 | 11-a | 11-b | 11-c | 11-d | | |
| 12 | 12-a | 12-b | 12-c | 12-d | | |
| 13 | 13-a | 13-b | 13-c | 13-d | | |
| 14 | 14-a | 14-b | 14-c | 14-d | | |
| 15 | 15-a | 15-b | 15-c | 15-d | | |

FIG. 4

POTENTIAL PRINT SETTINGS FROM MOBILE DEVICE

| Type | Print Settings | | | | | |
|---|---|---|---|---|---|---|
| 1 paper size | 1-a | 1-b | 1-c | 1-d | | |
| 2 two-sided | 2-a | 2-b | 2-c | | | |
| | | | | | | |
| 4 orientation | 4-a | 4-b | | | | |
| | | | | | | |
| | | | | | | |
| 7 color mode | 7-a | 7-b | | | | |
| | | | | | | |
| | | | | | | |
| | | | | | | |
| | | | | | | |
| | | | | | | |
| | | | | | | |
| | | | | | | |
| | | | | | | |

FIG. 5

Predefined Print Setting Group associated with Shorcut ID User-A

| Type | Predefined Print Settings |
|---|---|
| 1 | 1-a |
| 2 | 2-b |
| 3 | 3-a |
| 4 | 4-d |
| 5 | 5-a |
| 6 | 6-e |
| 7 | 7-a |
| 8 | 8-b |
| 9 | 9-a |
| 10 | 10-a |
| 11 | 11-b |
| 12 | 12-c |
| 13 | 13-d |
| 14 | 14-a |
| 15 | 15-a |

Predefined Print Setting Group associated with Shorcut ID User-B1

| Type | Predefined Print Settings |
|---|---|
| 1 | 1-b |
| 2 | 2-c |
| 3 | 3-a |
| 4 | 4-d |
| 5 | 5-c |
| 6 | 6-e |
| 7 | 7-a |
| 8 | 8-b |
|  |  |
|  |  |
|  |  |
| 12 | 12-c |
| 13 | 13-d |
| 14 | 14-a |
| 15 | 15-a |

Predefined Print Setting Group associated with Shorcut ID User-B2

| Type | Predefined Print Settings |
|---|---|
| 1 | 1-e |
| 2 | 2-c |
|  |  |
| 4 | 4-d |
|  |  |
|  |  |
| 7 | 7-a |
|  |  |
|  |  |
|  |  |
|  |  |
|  |  |
|  |  |
|  |  |
|  |  |

FIG. 8

METHOD, PRINTER, AND COMPUTER-READABLE MEDIUM FOR PRINTING WITH USER-SPECIFIED AND PREDEFINED SETTINGS

FIELD

This disclosure relates generally to printing and, more particularly, to handling of print settings.

BACKGROUND

Printers provide many options for printing. A user can establish print settings that specify color and two-sided printing, for example. Print settings can be established on a control panel on the printer or on a computer running specialized software, known as a printer driver. Some printers, particularly those known as multi-function peripherals (MFPs), have an abundant variety of sophisticated features, such as paper size selection, image reduction/enlargement, image correction (e.g., brightness, contrast, sharpness adjustment), stamping (e.g., watermarking or copy guard), printing resolution (e.g., draft mode or high resolution), finishing (e.g., collating, stapling, hole punching, folding, and output tray selection), scanning, and fax transmission just to name a few. A common approach to handling many print settings is a graphic user interface with menus. The menus are often organized hierarchically, where one menu selection leads to another menu, which may lead to yet another menu. The menus would vary from one printer to another due to differences in printer capabilities. This approach presents a challenge for small mobile devices, such as smartphones, which have become ubiquitous. First, small mobile devices have a correspondingly small display screen, so a menu that is designed for a relatively large display screen of a desktop or laptop computer may be inappropriate for mobile devices. Second, mobile devices have relatively low computing and memory capacity, so users prefer software applications (apps) that are lightweight or streamlined. For these reasons, printer drivers for mobile devices have been developed with minimal print setting capability. Also, Mopria Print Service and AirPrint now exist to enable wireless printing from mobile devices. These conventional solutions typically limit print setting to features that are most common. However, a problem arises when a user wants to access sophisticated printer features, in which case a user will have to abandon the convenience of printing from a mobile device and resort to printing from a desktop or laptop computer with a full-featured printer driver. Accordingly, as printers become more sophisticated and more users come rely on mobile devices, there is a need for a way for users to take advantage of the full scope of a printer's capabilities.

SUMMARY

Briefly and in general terms, the present invention is directed to a method, printer, and non-transitory computer readable medium.

In aspects of the invention, a method comprises: storing, by a printer, a plurality of predefined print setting groups; receiving, by the printer from a client device, a user-specified shortcut ID for a print job; associating, by the printer, the received user-specified shortcut ID to a designated group among the plurality of predefined print setting groups; receiving, by the printer from the client device, a user-specified print setting that conflicts with a first predefined print setting of the designated group and that does not conflict with a second predefined print setting of the designated group; and executing, by the printer, the print job by using the user-specified print setting and the second predefined print setting of the designated group.

In aspects of the invention, a printer comprises a processor and a memory storing a print software program, the processor executing instructions in the print software program to perform a printing process. The printing process comprises: storing, by the printer, a plurality of predefined print setting groups; receiving, by the printer from a client device, a user-specified shortcut ID for a print job; associating, by the printer, the received user-specified shortcut ID to a designated group among the plurality of predefined print setting groups; receiving, by the printer from the client device, a user-specified print setting that conflicts with a first predefined print setting of the designated group and that does not conflict with a second predefined print setting of the designated group; and executing, by the printer, the print job by using the user-specified print setting and the second predefined print setting of the designated group.

In aspects of the invention, a non-transitory computer readable medium having stored thereon computer readable instructions that, when executed by one or more computer processors of a printer, cause the printer to perform a printing process. The printing process comprises: storing, by the printer, a plurality of predefined print setting groups; receiving, by the printer from a client device, a user-specified shortcut ID for a print job; associating, by the printer, the received user-specified shortcut ID to a designated group among the plurality of predefined print setting groups; receiving, by the printer from the client device, a user-specified print setting that conflicts with a first predefined print setting of the designated group and that does not conflict with a second predefined print setting of the designated group; and executing, by the printer, the print job by using the user-specified print setting and the second predefined print setting of the designated group.

The features and advantages of the invention will be more readily understood from the following detailed description, which should be read in conjunction with the accompanying drawings.

BRIEF DESCRIPTION OF THE DRAWINGS

FIG. 4 is a table showing example print setting accepted by a printer.

FIG. 5 is a table showing example print settings to which a mobile device is limited.

FIG. 8 are tables showing example predefined print settings associated with different shortcut IDs.

DETAILED DESCRIPTION

Figure 1:
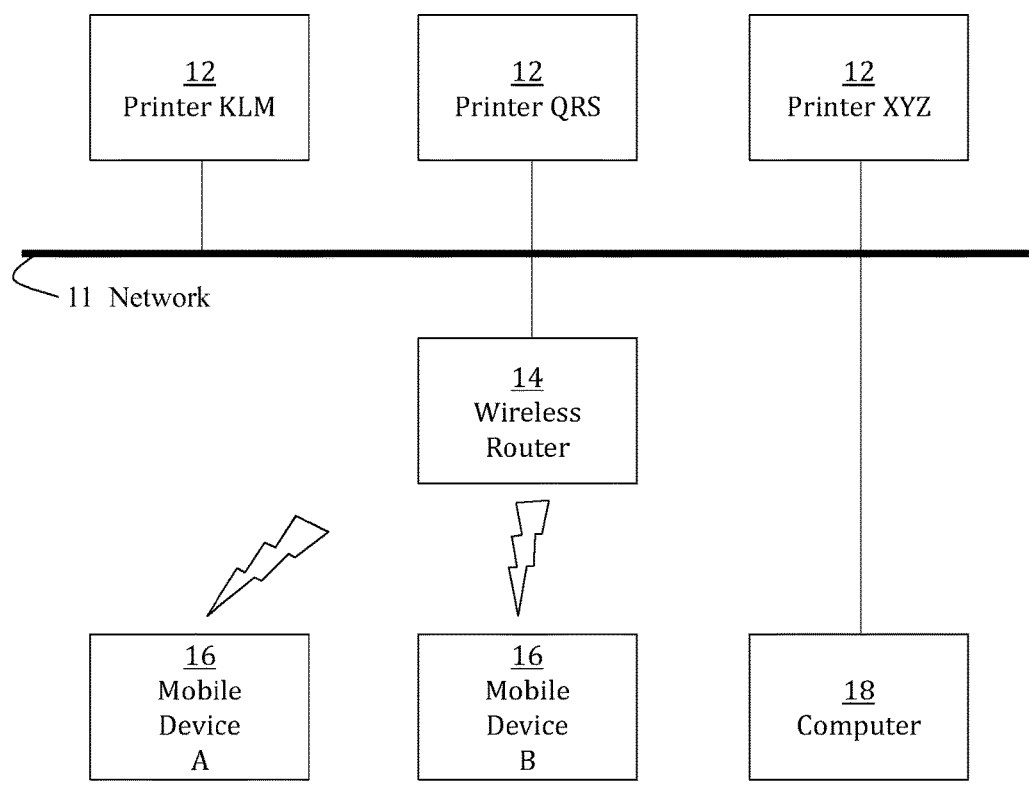
FIG. 1 is a schematic block diagram showing an example print system.

Referring now in more detail to the drawings for purposes of illustrating non-limiting examples, wherein like reference numerals designate corresponding or like elements among the several views, there is shown in FIG. 1 example system 10 that includes devices communicating via network 11, which can be the Internet, wireless local area network (LAN), wired-only LAN, other type of network, or a combination thereof. The devices include printers 12, wireless (over-the-air) router 14, mobile devices 16, and computer 18. Mobile devices 16 and computer 18 may be referred to as client devices that are served by printers 12. Printers 12 have different capabilities. For example, one printer may have color, two-sided, and finishing (e.g., stapling) features, while the others are capable of printing only in black on one side of paper and have no finishing capability.

Figure 2:
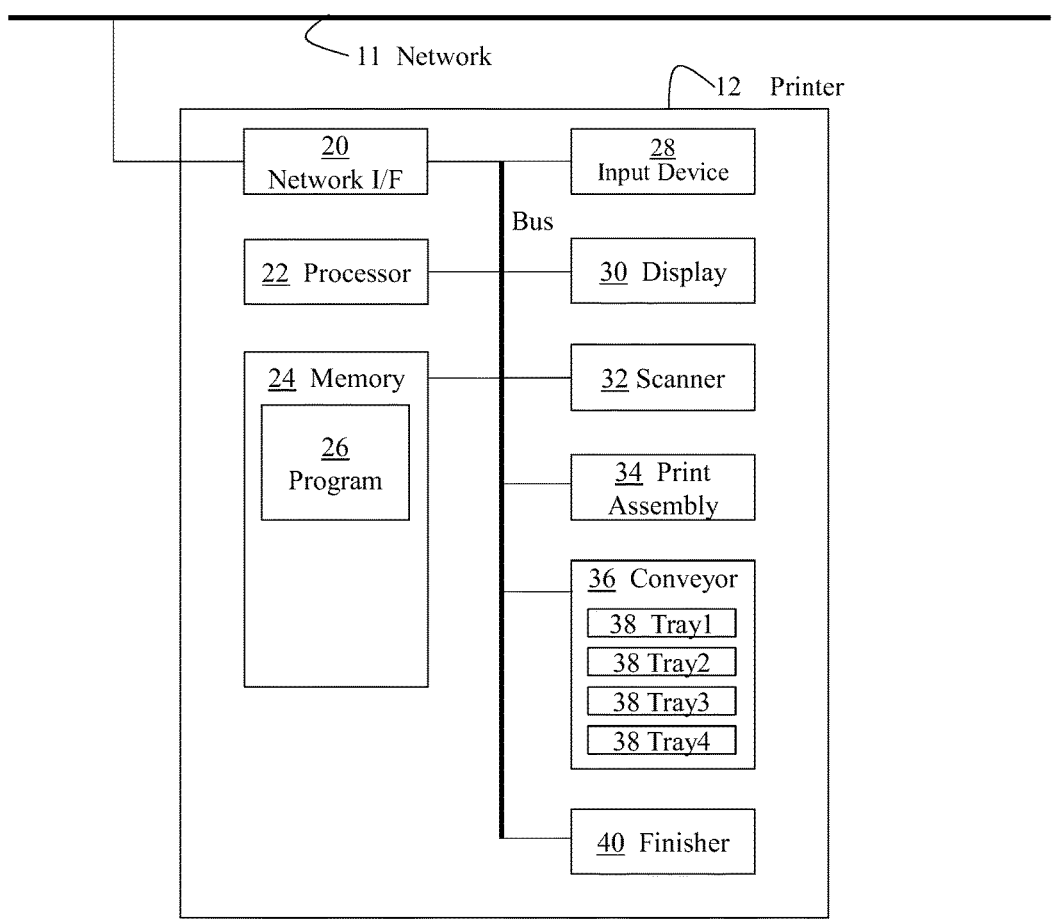
FIG. 2 is a schematic block diagram showing an example printer in the print system.

FIG. 2 shows example printer 12, which includes printer network interface 20, one or more computer processors 22, one or more memory devices 24, one or more input devices 28, printer display 30, scanner 32, print assembly 34, paper conveyor 36, paper trays 38, and finishing assembly 40.

Printer network interface (I/F) 20 is configured to allow printer 12 to communicate through network 11. Printer network I/F 20 includes circuits and electronic components configured for data communication through network 11. Printer network I/F 20 enables printer 12 to receive print jobs from client devices 16, 18. Print jobs define how printing is to be performed. Print jobs from the client devices may further include data that define an image, such a text document or photograph, to be printed. Also, the image data may be generated by scanner 32 discussed below.

The one or more computer processors 22 are collectively referred to as printer processor 22. Printer processor 22 includes circuits and electronic components that execute instructions within printer software program 26 for controlling elements of printer 12.

The one or more computer memory devices 24 are collectively referred to as printer memory 24. Printer memory 24 includes any one or a combination of random-access memory (RAM) modules, read-only memory (ROM) modules, and other electronic data storage devices. Printer memory 24 may include a mass storage type of device such as an optical CD or DVD drive, magnetic hard disk drive, or solid-state flash drive. Printer memory 24 includes a non-transitory computer readable medium that stores files associated with print software program 26. Print software program 26 may embody one or a combination of an operating system, plug-in, printer driver, and other software elements which together or independently enable printer 12 to perform the processes described herein. The non-transitory computer readable medium stores shortcut IDs and associated print settings, and may also store data for the print job received by printer 12.

The one or more input devices 28 are collectively referred to as printer input device 28. Printer input device 28 may include any one or more of a keyboard with buttons, touch-sensitive screen, mouse, electronic pen, microphone, and other means of user input. Printer display 30 may include a liquid crystal display or other type of visual display device. Printer input device 28 may be used by a user to navigate through a graphic user interface shown on printer display 30 to establish print settings.

Scanner 32 reads optical information of images on pages of a physical document that could be placed by a user on printer 12. Light is emitted by scanner 32, which is reflected by the physical pages. Scanner 32 senses the reflected light and converts it to electrical or digital information, which can be used to print pages that are duplicates of those of the physical document. Other scanning techniques may be used. Some printers 12 may not have a scanner.

Print assembly 34 prints images on sheets of paper or other types of physical media. The images are based on image data from mobile device 16, computer 18, or scanner 32. For example, print assembly 34 generates an electrostatic latent image on a rotating transfer device, which receives toner on the latent image and then transfers the toner to a sheet of paper. In color printing, multiple electrostatic latent images may be formed, one for each toner color. Other printing techniques may be used, such as ink jet printing.

Paper conveyor 36 includes rollers, belts, and mechanical guides that obtain sheets of paper or other physical media from an appropriate tray 38 and conveys the sheets to print assembly 34. Trays 38 may contain physical media differing in size, material type (e.g., paper, vellum, acetate, etc.), and weight. The rollers, belts, and mechanical guides are actuated by various motors electrically controlled based on signals generated by printer processor 22. Printer processor 22 determines the appropriate tray 38 from which to obtain physical media based on the print settings of a pint job. Some printers 12 may only have one tray 38.

Some printers 12 may not include finishing assembly 40 (abbreviated finisher). If included, finisher 40 may have one or more of a stapler, collator, hole puncher, and folding mechanism. The stapler is configured to staple sheets of paper together. For example, the stapler includes a pusher that pushes a cartridge of metal staples toward a driver which, when actuated, pushes one staple into two or more printed sheets. The driver is actuated by a stapler motor that is electrically controlled based on a signal generated by printer processor 22. The collator is configured to insert one or more sheets of paper between two sheets of paper. For example, the collator includes an arm or roller that pushes a sheet of paper between two other sheets of paper. The arm or roller is actuated by a collator motor that is electrically controlled based on a signal generated by printer processor 22. The hole puncher is configured to make a hole in sheets of paper. For example, the hole puncher includes a circular blade which, when pressed against paper, cuts a hole in the paper. The circular blade is actuated by a puncher motor that is electrically controlled based on a signal generated by printer processor 22. The folding mechanism is configured to fold paper. For example, the folding mechanism includes a paper guide, two rollers, and a fold blade. The fold blade is centered between the two rollers at a location below the rollers. The paper guide conveys a sheet of paper next to the fold blade, and then the fold blade pushes a central part of the paper into a nip area between the two rollers.

Wireless router 14 enables mobiles devices 16 to connect to network 11. Various wireless routers are known in the art, so elements of wireless router 14 need not be described in great detail herein. In system 10, wireless router 14 forwards data packets between printers 12 and mobile devices 16. For example, wireless router 14 can be a conventional Wi-Fi router that performs the functions of a router and also functions as a wireless (over-the-air) access point to network 11. A Wi-Fi router operates on IEEE 802.11 standards. Wireless router 14 may operate on other communication standards.

Figure 3:
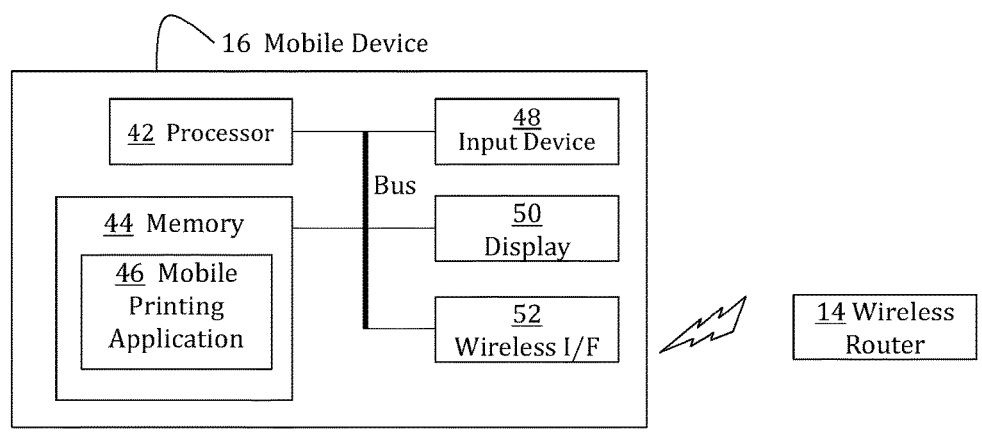
FIG. 3 is a schematic block diagram showing an example mobile device in the print system.

FIG. 3 shows example mobile device 16, which includes one or more processors 42, one or more memory devices 44, one or more input devices 48, display 50, and mobile network interface 52. For example, mobile device 16 can be a small handheld device, such as a smartphone, or it can be a tablet, laptop computer, or other device designed for portability. The one or more computer processors 42 are collectively referred to as mobile processor 42. Mobile processor 42 includes circuits and electronic components that execute instructions of mobile print software program 46 (also referred to as mobile app), which may embody one or a combination of an operating system, plug-in, printer driver, and other software elements which together or independently enable mobile device 16 to perform the processes described herein.

The one or more memory devices 44 are collectively referred to as mobile memory 44. Mobile memory 44 includes any one or a combination of random-access memory (RAM) modules, read-only memory (ROM) modules, and other electronic data storage devices. Mobile memory 44 may include a mass storage type of device such as a solid-state flash drive. Mobile memory 44 includes a non-transitory computer readable medium that stores mobile app 46 and may also store image data.

The one or more input devices 48 are collectively referred to as mobile input device 48. Mobile input device 48 may include any one or more of a keyboard with buttons, touch-sensitive screen, microphone, and other means for user input. Mobile display 50 may include a liquid crystal display or other type of visual display device. Mobile input device 48 may be used by a user to navigate through a graphic user interface (e.g., FIGS. 6, 7, 13, 15, 18 and 19) shown on mobile display 50 to establish print settings.

Mobile network interface (I/F) 52 is configured to allow mobile device 16 to communicate with printers 12 and other devices. Mobile network I/F 52 includes circuits and electronic components configured for data communication through network 11. Mobile network I/F 52 enables mobile device 16 to send print jobs to printers 12. Mobile network I/F 52 may enable mobile device 16 to access the Internet and receive email, through which a document could be obtained for printing. Mobile network I/F 52 may enable mobile device 16 to communicate with computer 18 to obtain a document for printing.

Computer 18 can be a desktop computer, workstation, or print server, which can provide an alternative means of sending print jobs to printers 12. Although the printing method described herein has advantages for small mobile devices, the printing method can also be utilized with larger devices such as computer 18. Desktop computers, workstations, and print servers are known in the art, so elements of such devices need not be described in great detail herein. For example, computer 18 may include computer processors, memory devices, input devices, a display, and a network interface. The processors include circuits and electronic components that execute instructions in software for sending print jobs. Memory devices may include a non-transitory computer readable medium that stores image data and the printing software. The printing software may embody one or a combination of an operating system, plug-in, printer driver, and other software elements which together or independently enable computer 18 to perform the processes described herein. The input devices may include any one or more of a keyboard with buttons, touch-sensitive screen, mouse, electronic pen, microphone, and other means of user input. The display may include a liquid crystal display, projector, or other type of visual display device. The input devices may be used by a user to navigate through a graphic user interface shown on the computer display to establish print settings. The computer network interface is configured to allow computer 18 to communicate with printers 12 and optionally mobile devices 16. It also enables computer 12 to send print jobs to printers 12, and may enable computer 12 to access the Internet and receive email, through which a document could be obtained for printing.

FIG. 4 illustrates how printer 12 may accept a great variety of print settings. The first column lists fifteen different types of print settings. Some types are common to most printers. For example, common types can be paper size, two-sided printing, orientation, and color mode. For example, print setting type 1 could be for paper size. In the row for type 1, settings 1-a, 1-b, 1-c, 1-d, 1-e, and 1-f are for letter size, legal size, tabloid size, A4 size, A3 size, and A2 size. Print setting type 2 could be for two-sided print mode, with settings 2-a, 2-b, and 2-c for none (one-sided printing), two-sided printing with pages oriented to allow for horizontal page turning, and two-sided printing with pages oriented to allow for vertical page turning. Print setting type 4 could be for image orientation, with 4-a through -d for portrait, landscape, 90 degree rotation, and mirror image. Print setting type 7 could be for color mode, with 7-a and 7-b for color and black-only printing. The other print setting types in FIG. 4 which are not labeled may be less common, such as image brightness adjustment, with possible print settings for −20%, 0%, and +20%. Other examples of less common types include stamping (with settings for watermarking), printing resolution (with settings for draft mode or high resolution), various finishing (with settings for stapling, hole punching, folding, and output tray selection), and image size (with settings for −50%, −25%, 0%, +25%, +50%) just to name a few. In the example of FIG. 4, the printer is capable of accepting fifteen types of print settings. In other aspects, the printer may be capable of accepting less than five, less than ten, or more than 15 types of print settings.

FIG. 5 illustrates how mobile app 46 may restrict the number of user-specified print settings. In this example, the mobile app allows the user to specify only the common print setting types from FIG. 4. Also, the mobile app may restrict selections within some of the common print setting types. For example, the mobile app allows the user to specify paper size (setting type 1) but does not allow the user to select A3 size (setting 1-e) or A2 size (setting 1-f). Also, the mobile app allows the user to specify orientation (setting type 4) but does not allow the user to select 90-degree rotation (setting 4-c) or mirror image (setting 4-d). In this example, the client device restricts the user to 4 types of print settings. In other aspects, the client device restricts the user to 1 to 3 types of print settings. Instead of a maximum of 3 types, the maximum could be 10 or 20 types of print settings.

Figure 6:
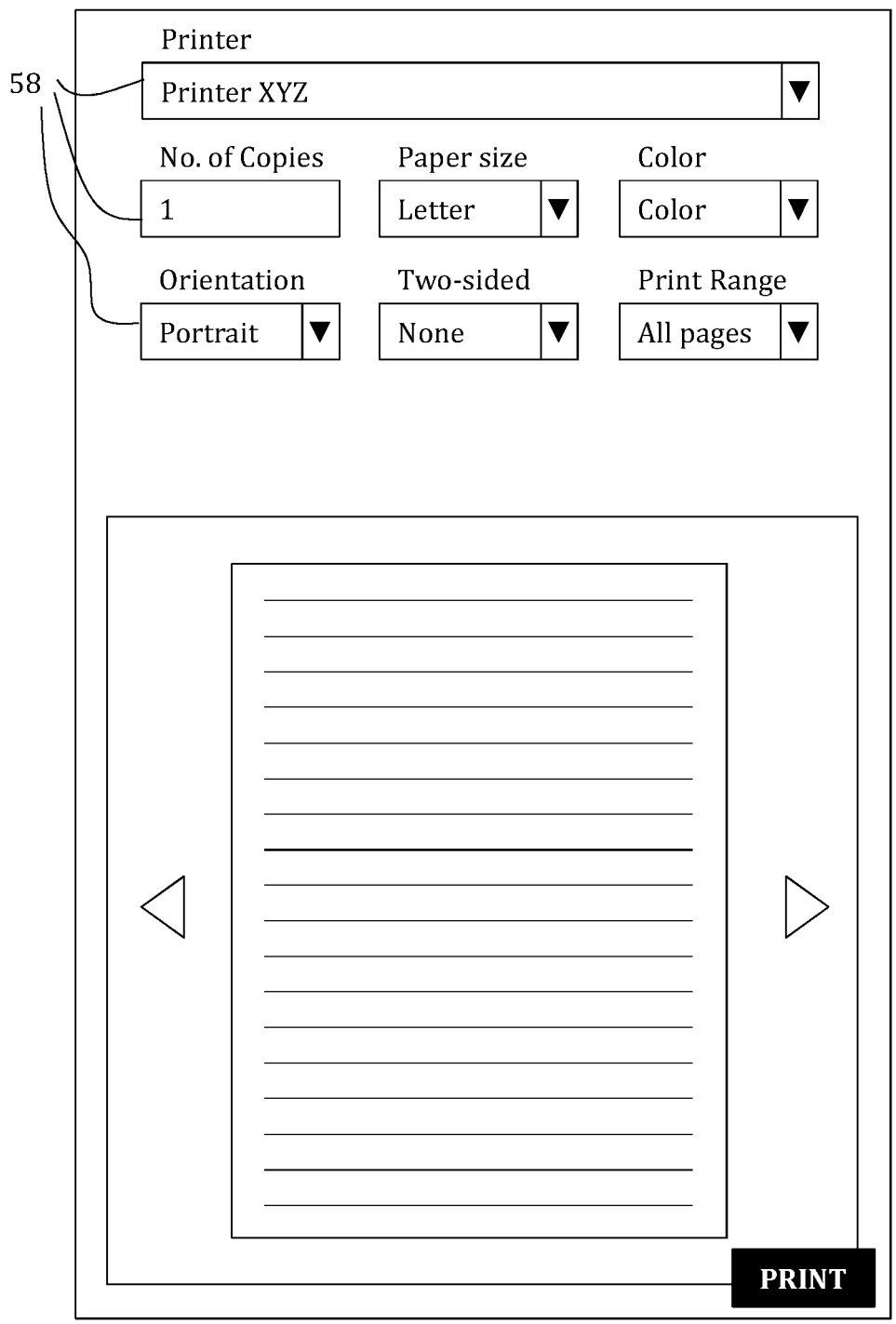
FIG. 6 is a diagram showing an example graphic user interface that does not allow a user to print with all print setting accepted by a printer.

FIG. 6 shows an example graphic user interface (GUI) that can be displayed on the display screen of mobile device 16 or computer 18. The GUI allows the user specify only the common types print settings according to FIG. 5. The GUI has various input fields 58, which the user may populate by using a keyboard (such as entering a number of copies to be printed) or by using dropdown menus. Continuing from the example of FIG. 5, a user may click the down arrow under "Paper size" to reveal a dropdown menu that allows the user to select one of letter size, legal size, tabloid size, and A4 size, but not A3 size and A2 size. The down arrow under image orientation reveals a dropdown menu that allows the user to select either portrait or landscape but not 90 degree rotation or mirror image. A problem arises when the user wants a print setting that is missing from the GUI of FIG. 6.

Figure 7:
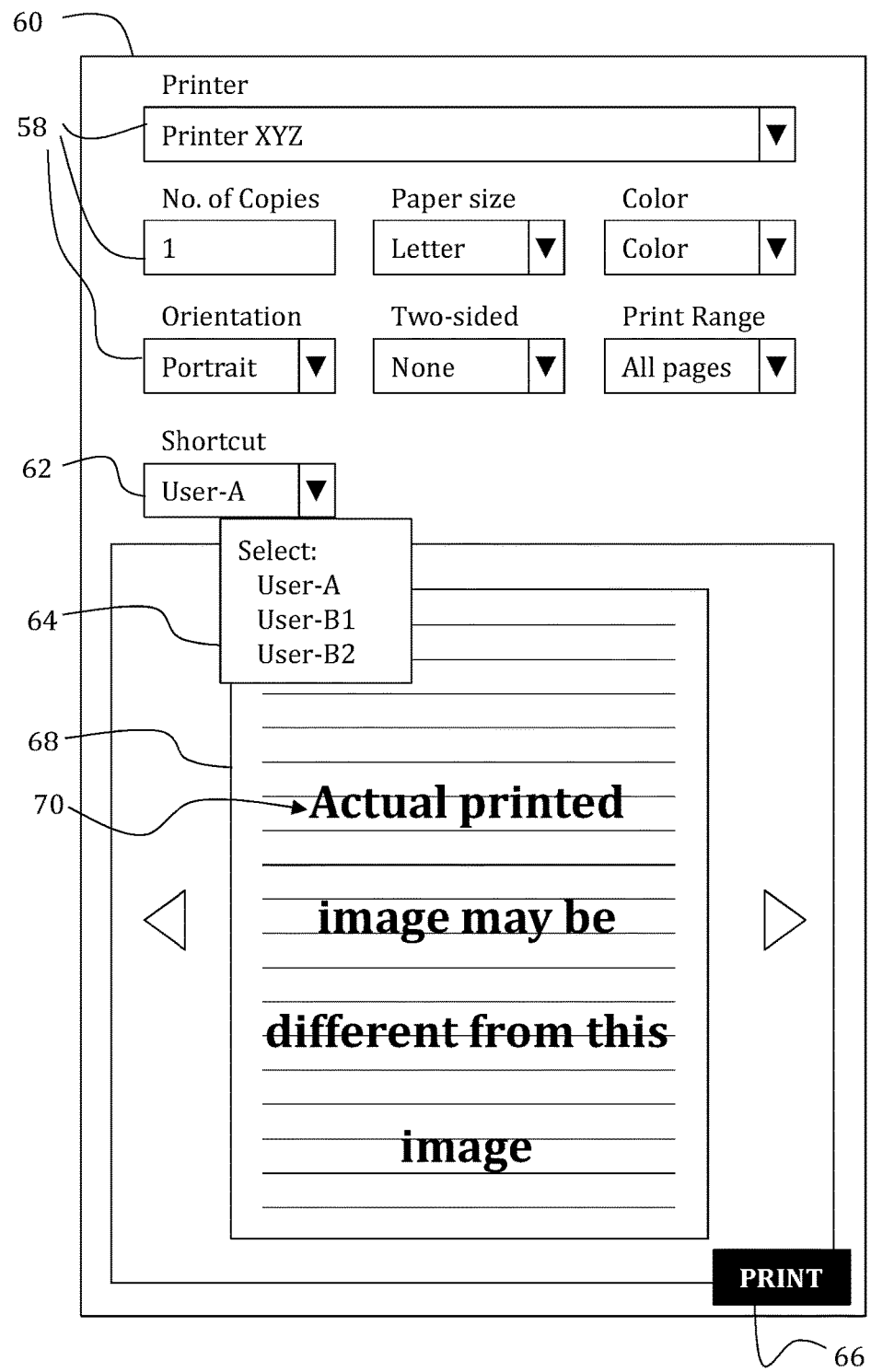
FIG. 7 is a diagram showing an example graphic user interface that can allow a user to print with all print setting accepted by a printer.

FIG. 7 shows example graphic user interface 60 that allows the user to establish many more print settings without being bothered with too many input fields and menus. Although the graphic user interface is almost the same as that of FIG. 6, a user could, if desired, establish print settings for all print setting types that printer 12 is capable of accepting. This is done without having to add input fields for every print setting type. In this example, graphic user interface 60 does not have separate input fields for brightness, stamping, print resolution, finishing, and image size, yet the user may establish print settings for 20% brightness increase, watermark stamping, high resolution printing, stapling, and 50% image size reduction, if desired. This is accomplished with shortcut input field 62, which the user populates with a shortcut identifier (ID) associated with a group of predefined print settings. For example, the user may select shortcut ID User-A from dropdown menu 64.

FIG. 8 shows example settings for shortcut IDs User-A, User-B1, and User-B2. The IDs having associated with them a group of predefined print settings. The predefined settings may encompass all print settings types that printer 12 is capable of accepting, such as shown for shortcut ID User-A. For shortcut IDs User-B1 and User-B2, the predefined settings may encompass a fewer number of print setting types. In other examples, the predefined settings may encompass only two, four, or six print setting types, For shortcut IDs User-A and User-B1, the predefined settings may encompass print setting types for which there is no dedicated input field in graphic user interface 60 of FIG. 7. For example, the predefined print settings associated with User-A and User-B1 encompass print setting type 3, 5, and 6, which could be for stapling, brightness, and image size. There are no dedicated input fields for stapling, brightness, and image size in graphic user interface 60 of FIG. 7.

For shortcut ID User-B2, the predefined settings may encompass only the print setting types for which there are dedicated input fields 58 in graphic user interface 60 of FIG. 7. Note that the predefined print settings include settings (1-e for A3 size paper and 4-d for mirror image) that cannot be established using the dedicated input fields 58 in graphic user interface 60. As previously mentioned, dropdown menus for input fields 58 do not allow for selection of A3 size paper and 4-d for mirror image.

Figure 9:
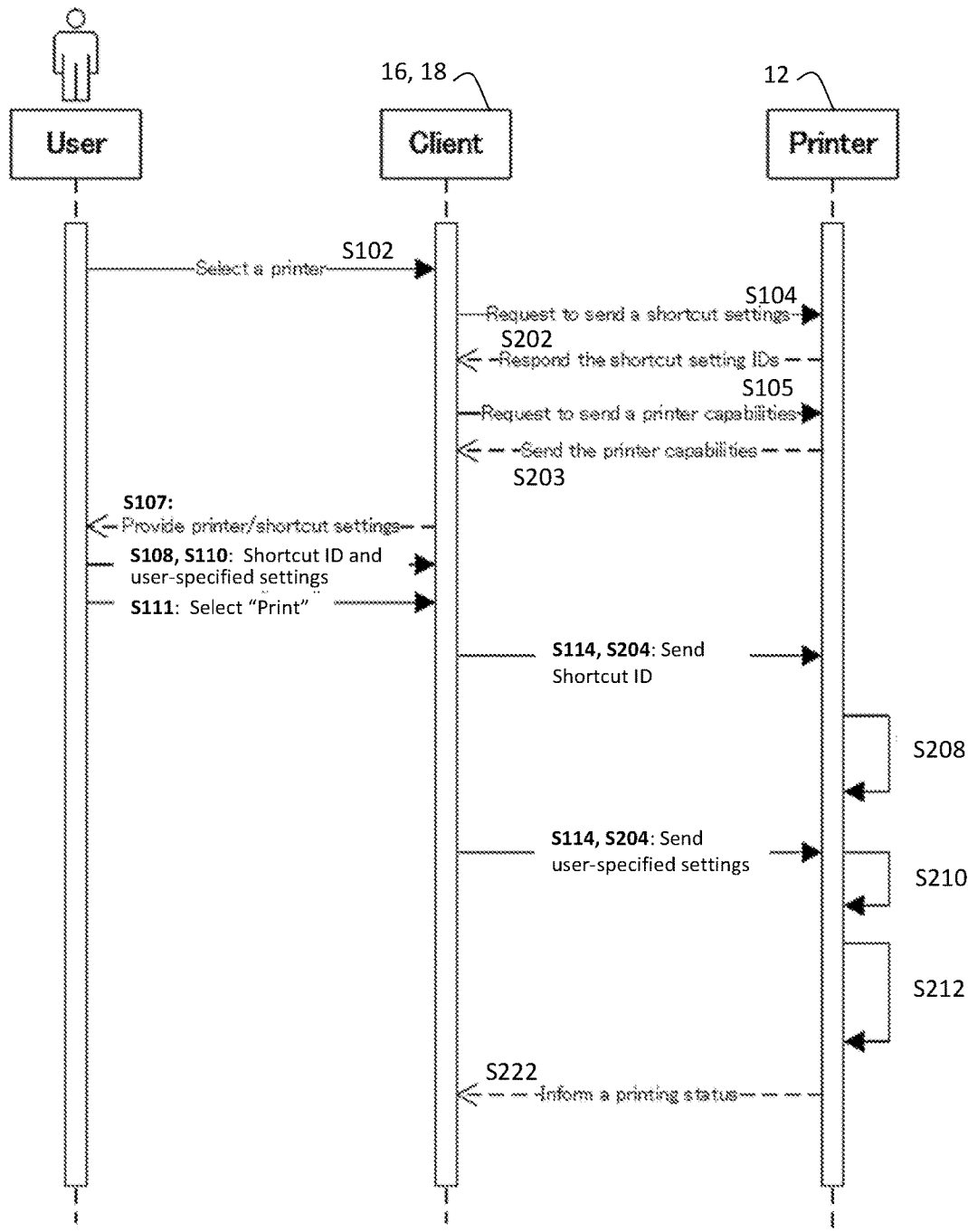
FIGS. 9 and 10 are flow diagrams showing an example printing method involving shortcut IDs.
Figure 10:
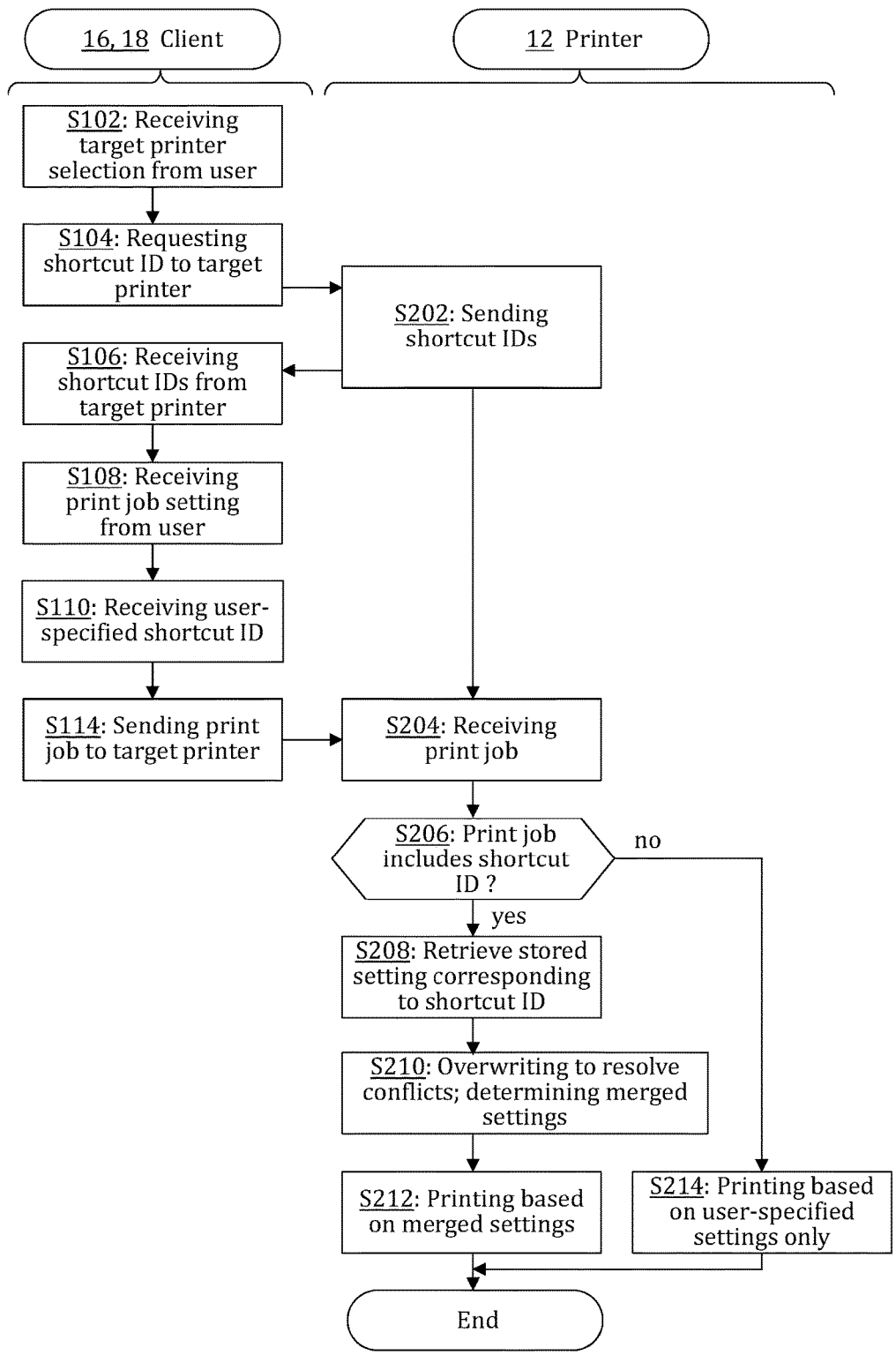

FIGS. 9 and 10 show an example printing method. The term "client device" refers to either mobile device 16 or computer 18. At S102, a user selects a printer to which the user wishes to send a print job. For example, mobile app 46 in mobile device 16 or a print software program stored in computer 18 may detect a plurality of printers 12 on network 11. When the user clicks the down arrow under "Printer" in graphic user interface 60, a dropdown menu shows all the printers, and the user may select one of them by name (e.g., Printer XYZ) to be the target printer.

At S104, the client device sends a shortcut request to printer 12 (the target printer) that was selected in S102. The shortcut request is for a list of one or more shortcut IDs that is stored in memory 44 of the target printer. Each shortcut ID is associated with a group of predefined print settings, which is also stored in memory 44. The target printer receives the shortcut request from the client device.

At S202, the target printer sends a shortcut list to the client device in response to the received shortcut request. At S106 (FIG. 10), the client device receives the shortcut list. The shortcut list includes one or more shortcut IDs as members of the shortcut list. Each of the shortcut IDs corresponds to a different one of the plurality of predefined print setting groups. For example, the target printer may send a shortcut list that includes shortcut IDs User-A, User-B1, and User-B2. These shortcut IDs may be associated with predefined print setting groups shown in FIG. 8, for example.

At S105 (FIG. 9), the client device sends a capability request to the target printer. The target printer receives the capability request. At S203, the target printer sends its capabilities to the client device in response to the received request. For example, the target printer may not be capable for color printing, so the client device is informed of this limitation and may disable the input field for color printing in graphic user interface 60.

At S107 (FIG. 9), the shortcut list is shown to the user. For example, the user may see the shortcut list in dropdown menu 64. Dropdown menu 64 (FIG. 7) may be extremely long if the target printer has stored a high number of shortcut IDs, as might occur due to many users in an office. This can make it difficult for a user to find a desired shortcut ID. To address this potential problem, the target printer may associate each shortcut ID to particular users. For example, the target printer may store a lookup table, as shown in Table I.

TABLE I

| User Name | User ID | Shortcut ID |
| --- | --- | --- |
| Hanoko | A | User-A |
| John | B | User-B1 |
| John, Hanoko | B, A | User-B2 |

In Table I, the user ID is "A" for Hanoko, though the user ID can be the user's name, employee number, or a unique identifier for the user's mobile device. The printer associates a plurality of shortcut IDs with a plurality of users that includes a first user (e.g., Hanoko) and a second user (e.g., John). The plurality of shortcut IDs includes a first, second, and third shortcut ID (e.g., User-A, User-B1, User-B2). The first and third shortcut IDs are associated with the first user (Hanoko). The second shortcut ID is associated with the second user (John) and is not associated with the first user (Hanoko).

In this example, the printer receives from the client device a user ID corresponding to the first user (Hanoko). This may occur at S204, if the print job includes the user ID. The printer determines the members of the shortcut list using the received user ID. Since the received user ID corresponds to Hanoko, the members of the shortcut list include the first and third shortcut IDs (User-A and User-B2) and excludes the second shortcut ID (User-B1). Thus, when Table I is implemented, dropdown menu 64 in FIG. 7 would include only User-A and User-B2.

At S108 (FIGS. 9 and 10), the client device receives print settings from the user (user-specified print settings). For example, the user may populate input fields 58 in graphic user interface 60 for common types of print settings. At S110, the client device receives a user-specified shortcut ID from the user. For example, the user may populate shortcut input field 62 with a user-specified shortcut ID selected from dropdown menu 64.

At S111 (FIG. 9), the user selects "print" when the user is finished with establishing print settings and wants to send the print job. For example, the user may press print button 66 in graphic user interface 60.

At S114 (FIGS. 9 and 10), the client device sends a print job to the target printer in response to the user's "print" selection at S111. The print job includes the user-specified print settings and the user-specified shortcut ID, if any. For example, it is possible that the user did not select a shortcut ID at S106. The print job may also include image data, such as data for a document or photograph, to be printed.

At S204 (FIGS. 9 and 10), the target printer receives the print job. At S206 (FIG. 10), the target printer determines whether the print job includes a user-specified shortcut ID. If no, the process proceeds to S214, where the print job is executed by the target printer according to user-specified print settings, not according to a group of predefined print settings. Execution includes printing on physical media (e.g., paper, vellum, acetate, etc.).

If yes at S206, the process proceeds to S208 (FIGS. 9 and 10) where the target printer associates the user-specified shortcut ID to a designated group among the plurality of predefined print setting groups. For example, if the user-specified shortcut ID is User-A, the target printer associates the user-specified shortcut ID with the predefined print setting group (designated group) shown on the left side of FIG. 8. This can be performed by matching the user-specified shortcut ID (e.g., User-A) to a shortcut ID (User-A) of the designated group. Next, the target printer retrieves the designated group from memory.

Figure 11:
FIGS. 11 and 12 are tables showing example merged print setting groups obtained by modifying predefined print settings.

Next at S210 (FIGS. 9 and 10), the target printer performs a print setting merge procedure to resolve all print setting conflicts, if any. FIG. 11 shows examples of print setting conflicts when the user-specified shortcut ID is User-A. The user-specified print settings include settings that conflict with some of the predefined print settings of the designated group. FIG. 11 shows some of the user-specified print settings established from graphic user interface 60 of FIG. 7. The user-specified print settings include letter size paper (setting 1-a), one-sided printing (setting 2-a), portrait orientation (setting 4-a), and color printing (setting 7-a). FIG. 11 also shows the predefined print settings of the designated group associated with User-A. By comparing print settings of the same print setting type, the target printer determines that there are conflicts (i.e., differences) between setting 2-a and setting 2-b, and between setting 4-a and setting 4-d. The merge procedure at S210 resolves the conflict by giving priority to the user-specified print settings over the predefined print settings. Where a conflict exists, the predefined print setting is overwritten by the user-specified print setting. This results in a merged print setting group at the right side of FIG. 11. The merged print setting group includes all the predefined print settings except those that conflict with a user-specified print setting.

Figure 12:

FIG. 12 shows examples of print setting conflicts if the user-specified shortcut ID is User-B1 instead of User-A. By comparing print settings of the same print setting type, the target printer 12 determines that there are conflicts (i.e., differences) between 1-a and 1-b, between 2-a and 2-c, and between 4-a and 4-d. At S210 (FIGS. 9 and 10), priority is given to user-specified settings 1-a, 2-a, and 4-a, so the merged print setting group includes these settings and does not include predefined settings 1-b, 2-c, and 4-d.

After S210, the process proceeds to S212 where the target printer executes the print job by using the merged print setting group. In FIG. 11 for example, a user-specified print setting (e.g., setting 2-a) conflicts with a first predefined print setting (e.g., setting 2-b) of the designated group and does not conflict with a second predefined print setting (e.g., setting 1-a) of the designated group. At S212, the target printer refers to the merged print setting group and executes the print job using the user-specified print setting (2-a) and the second predefined print setting (1-a) of the designated group. In FIG. 12 for example, a user-specified print setting (e.g., 4-a) conflicts with a first predefined print setting (e.g., 4-d) of the designated group and does not conflict with a second predefined print setting (e.g., setting 15-a) of the designated group. At S212, the target printer refers to the merged print setting group and executes the print job using the user-specified print setting (4-a) and the second predefined print setting (15-a) of the designated group. The target printer executes the print job without using the first predefined print setting (4-d) of the designated group. Execution includes printing on physical media (e.g., paper, vellum, acetate, etc.).

At S222 (FIG. 9), the target printer may send status information to the client device during and after execution of the print job. For example, the status information may indicate "printing in progress" or "printing completed."

Referring again to FIG. 7, graphic user interface 60 includes preview image 68 of what will be printed. For example, preview image 68 can be a page of a document that is to be printed. The user-specified print settings (e.g., color mode) entered by the user in input fields 58 may be applied to preview image 68 so the user can see the effect of the user-specified print settings before printing. In response to entry of a user-specified shortcut ID in shortcut input field 62, the client device may add advisory note 70 that tells the user that actual printing might have results that differ from preview image 68. This is because predefined print settings associated with the user-specified shortcut ID will be used for printing but are unknown to the client device.

As discussed above, selection of a target printer by the user at S102 causes the client device to send a request for a list of shortcuts at S104, and then the target printer responds at S202 by sending a shortcut list to the client device. The shortcut list allows the user to select a user-specified shortcut ID from a dropdown menu. Therefore, sending the shortcut list by the target printer enables the target printer to receive the user-specified shortcut ID from the client device. However, as previously mentioned, mobile device users prefer software applications that are lightweight because mobile devices have relatively low computing and memory capacity. This can be achieved by minimizing functions. For example, the functions associated with S104 and S202 can be eliminated as discussed below.

Figure 13:
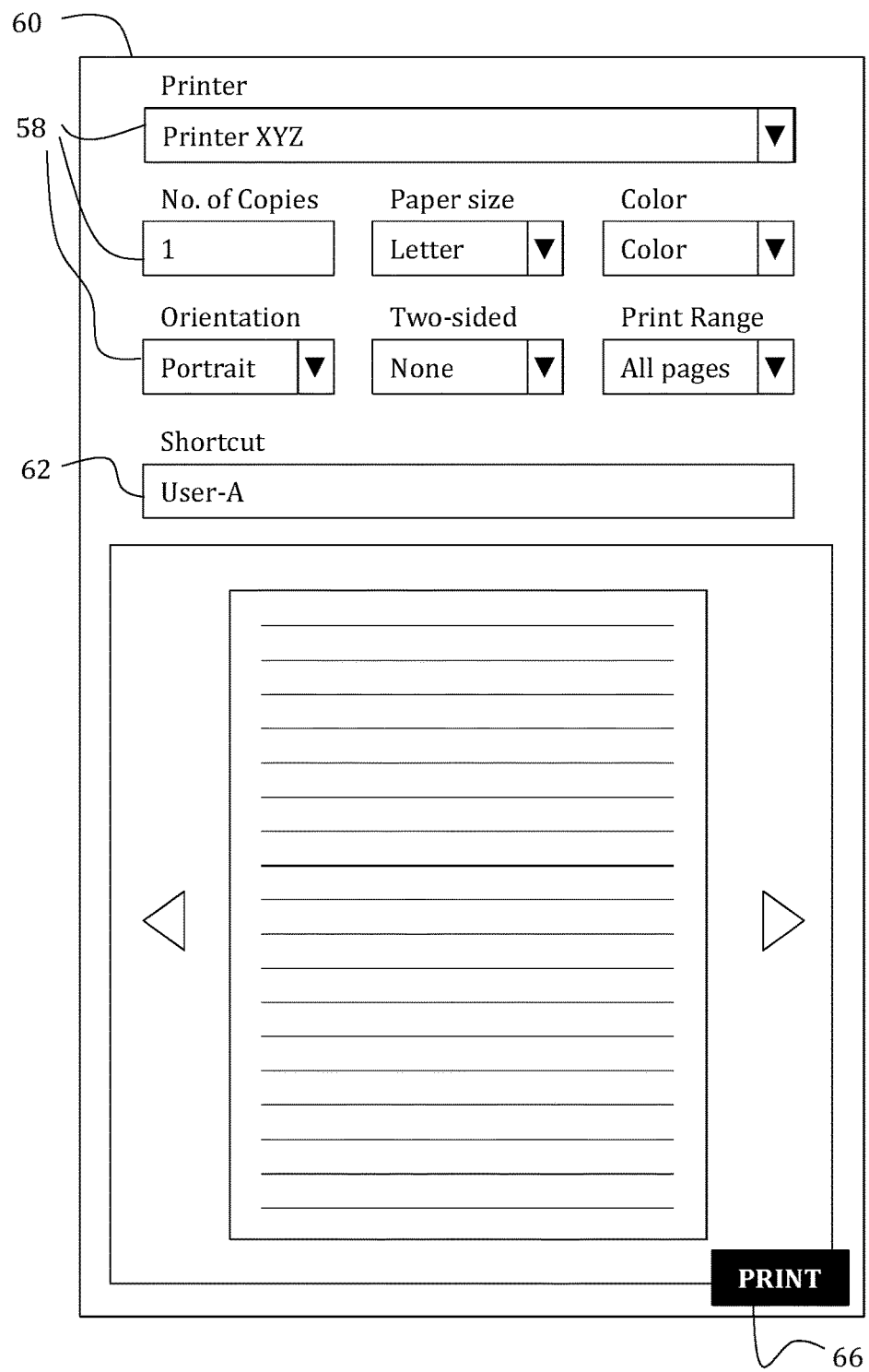
FIG. 13 is a diagram showing an example graphic user interface.
Figure 14:
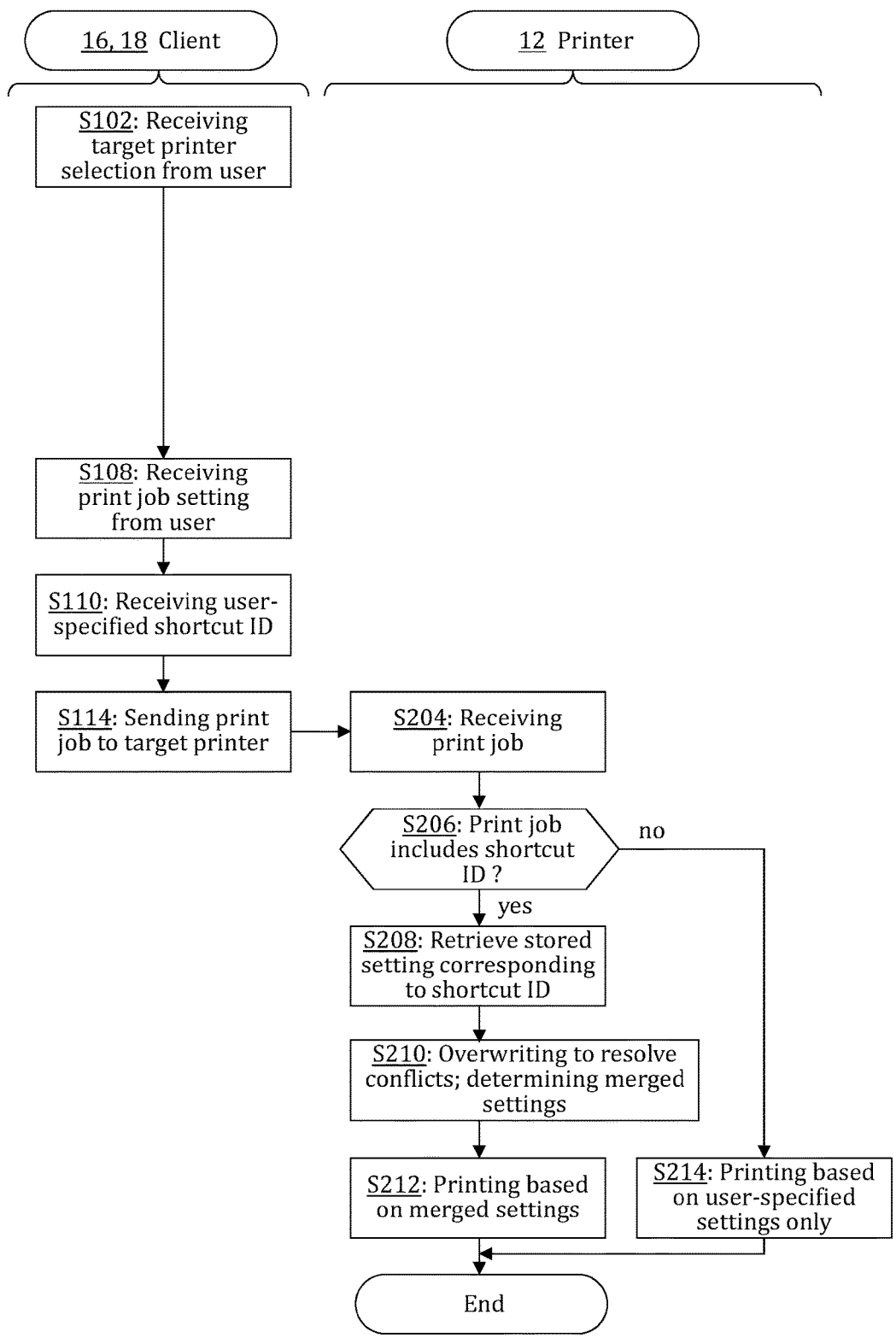
FIG. 14 is a flow diagram showing an example printing method.

FIGS. 13 and 14 show an example graphic user interface and flow diagram for an example printing method that does not rely on a shortcut list.

FIG. 13 is the same as FIG. 7, except shortcut input field 62 is not populated using a dropdown menu. In FIG. 13, the user populates shortcut input field 62 by entering a user-specified shortcut ID via a touchscreen keyboard or a microphone, for example, instead of a dropdown menu.

FIG. 14 is the same as FIG. 10 except S104, S202, and S106 are absent from FIG. 14. Since S104, S202, and S106 are eliminated, mobile app 46 does not interrogate the target printer to a get a shortcut list. The ability of the target printer to receive the user-specified shortcut ID (as part of the print job) at S204 is not enabled by a transmission by the target printer of a shortcut list.

As discussed above, conflicts between user-specified print settings and predefined print settings can always be resolved in favor of user-specified print settings. That is, priority is given by default to all the user-specified print settings. A problem may arise in which the graphic user interface of the client device allows the user to establish a type of print setting (e.g., paper size) but does not show all possible settings for the print setting type (e.g., A2 size). This problem may occur when the graphic user interface is intentionally designed to have dropdown menus that contain only the most common settings for ease of use and/or to keep the mobile app lightweight. This problem may be avoided as described below.

FIGS. 15-18 relate to an example printing method involving priority designators. Priority designators allow the user to determine which settings are given priority when the target printer subsequently resolves conflicts (i.e., differences) between user-specified print settings and predefined print settings.

Figure 15:
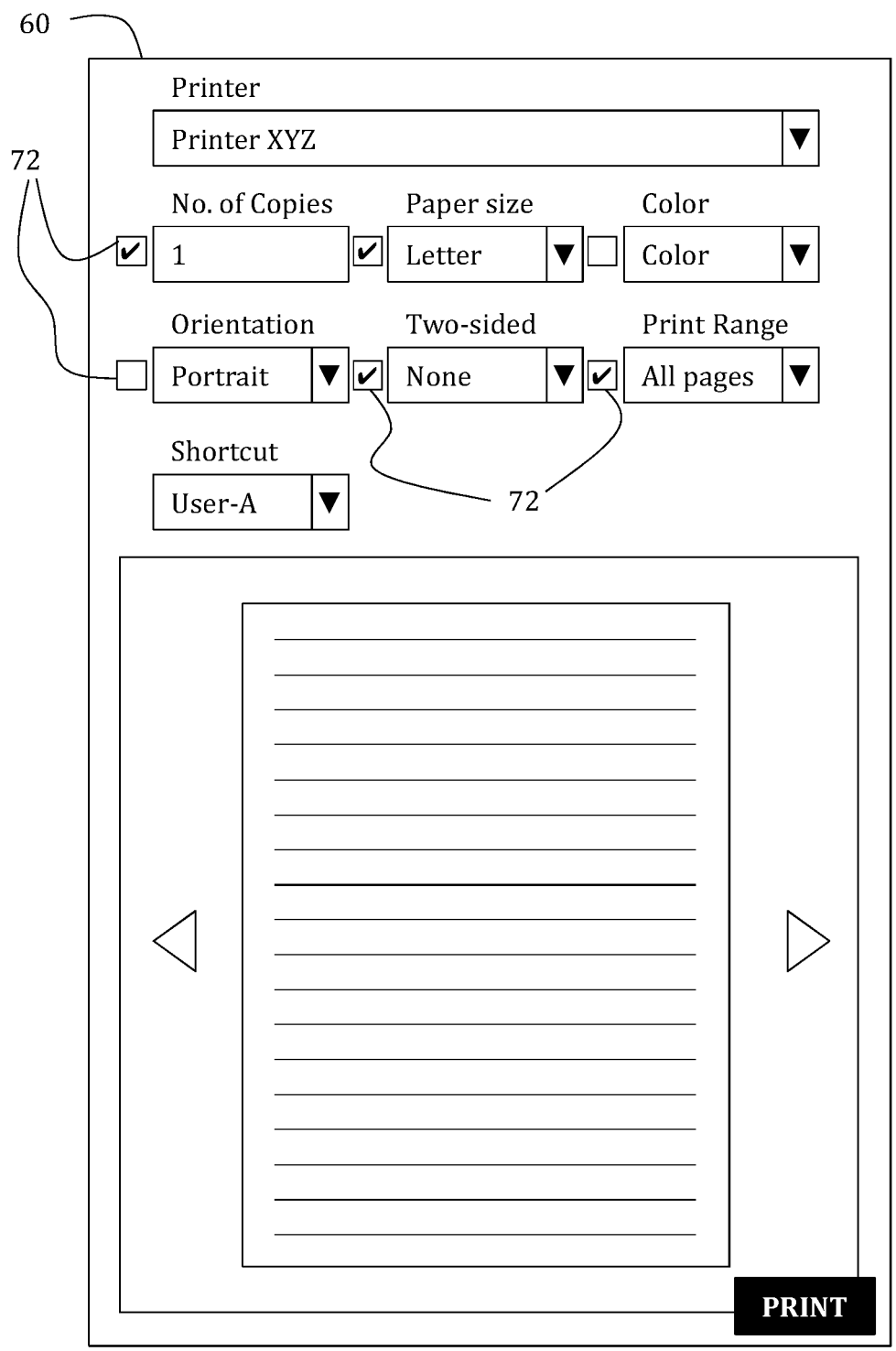
FIG. 15 is a diagram showing an example graphic user interface.

FIG. 15 is the same as FIG. 7 except for the addition of priority checkboxes 72. There is a priority checkbox associated with each input field for user-specified print settings. The user clicks on the checkbox to add or remove a checkmark from the checkbox. A checkmark indicates that the corresponding user-specified print setting will take priority over the predefined print setting if there is a conflict. For example, a checkmark causes the client device to generate a priority designator for the corresponding user-specified print setting. The priority designator can be a binary flag or other code. Absence of a checkmark indicates that the corresponding user-specified print setting (e.g., default settings for color printing and portrait orientation) will not take priority and, instead, the predefined print setting will take priority if there is a conflict. In FIG. 15, the user has applied checkmarks next to four print setting types: No. of Copies, Paper size, Two-sided, and Print Range. The client device generates priority designators for these print setting types.

Figure 16:
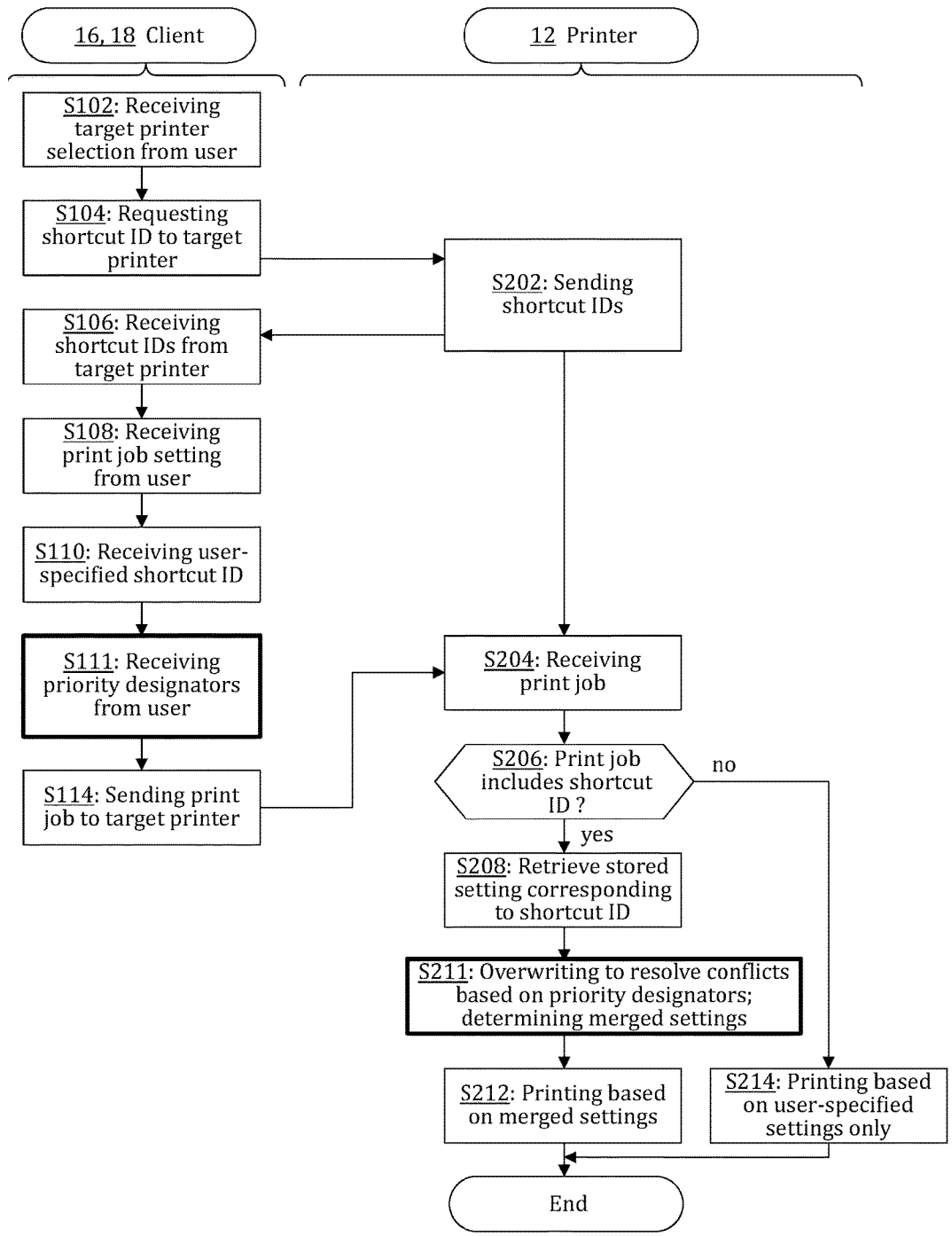
FIG. 16 is a flow diagram showing an example printing method.

FIG. 16 is the same as FIG. 10, except as discussed here. S111 is added. At S111, the user applies checkmarks to desired priority checkboxes 72. In effect, the client device receives the user's selection of print setting types that will be given priority over predefined print settings. At S114, the print job, which includes the priority designators, is sent to the target printer.

Figure 17:
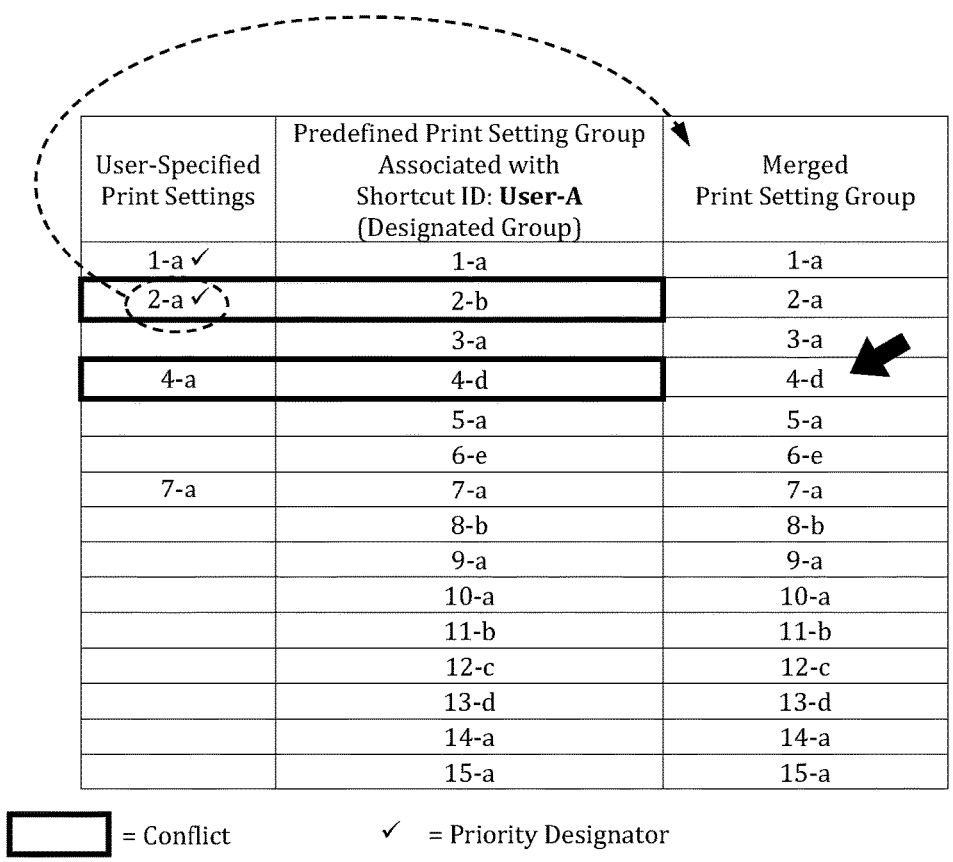
FIG. 17 is a table showing an example merged print setting group obtained by modifying predefined print settings.

S211 in FIG. 16 replaces S210 of FIG. 10. S211 is like S210 except the target printer uses the priority designators to perform the print setting merge procedure to resolve print setting conflicts. FIG. 17 shows examples of print setting conflicts when the user-specified shortcut ID is User-A. The merged print setting group in FIG. 17 is the same as that in FIG. 11 except where indicated by the large arrow. This is due to absence of a proper priority designator for orientation setting 4-a. There are two conflicts: 2-a versus 2-b; and 4-a versus 4-d. The merge procedure at S211 resolves the conflict by giving priority only to the user-specified print settings that have priority designators. The predefined print setting is overwritten by the user-specified print setting only if the user-specified print has a priority designator. In this example, user-specified setting 2-a has a priority designator, so 2-a overwrites 2-b and 2-a is included in the merged print setting group. User-specified print setting 4-a does not have a priority designator, so 4-a does not overwrite predefined setting 4-d. Predefined setting 4-d is included in the merged print setting group instead of 4-a.

In the above description, the priority designator prioritizes the user-specified print setting (e.g., setting 2-a) for use in executing the print job such that a conflicting print setting (setting 2-b) included in the designated group is not used in executing the print job. In the following description, priority designators prioritize predefined print settings instead of prioritizing user-specified print settings.

Figure 18:
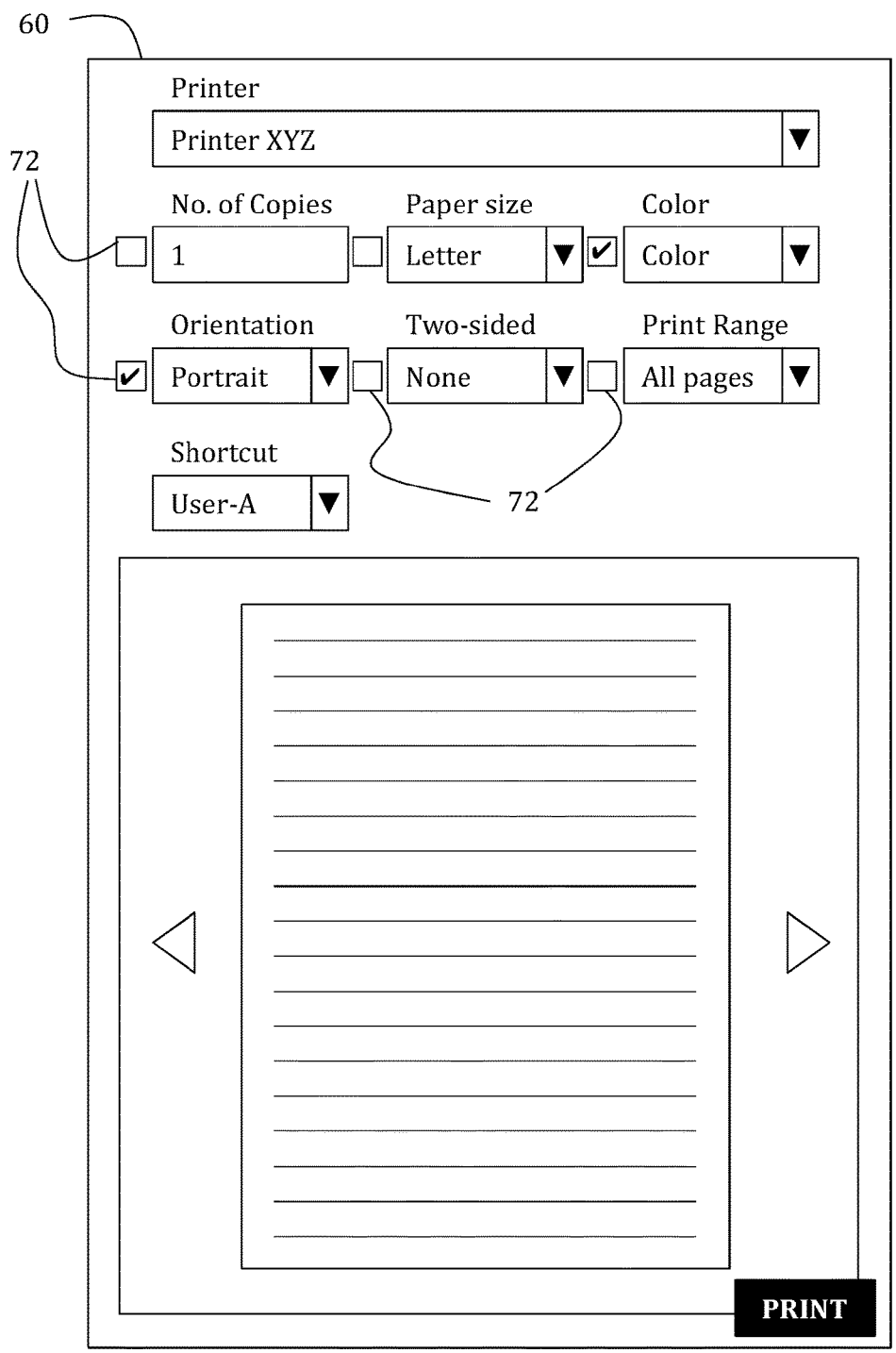
FIG. 18 is a diagram showing an example graphic user interface.

FIG. 18 shows an example graphic user interface that looks the same as that in FIG. 15. Compared to FIG. 15, priority checkboxes 72 in FIG. 18 function in reverse. Absence of a checkmark indicates that the corresponding user-specified print setting (e.g., settings No. of Copies, Paper size, Two-sided, and Print Range) will take priority. A checkmark indicates that the corresponding user-specified print setting (e.g., default settings for color printing and portrait orientation) will not take priority over the predefined print setting if there is a conflict. In effect, a checkmark de-prioritizes the corresponding user-specified print setting.

The merge procedure at S211 of FIG. 16 resolves the conflict by giving priority only to the user-specified print settings that are not de-prioritized with a checkmark. Where there is a conflict, the predefined print setting is overwritten by the user-specified print setting unless the user-specified print setting is de-prioritized by a checkmark. In this example, we assume the same conflicts previously discussed: 2-a versus 2-b; and 4-a versus 4-d. In FIG. 18, user-specified setting 4-a (portrait orientation) is de-prioritized with a checkmark, so it will not be included in the merged print setting group. Instead, predefined setting 4-d (mirror image orientation) will be included in the merged print setting. Thus, the priority designator prioritizes the predetermined print setting (4-d) included in the designated group for use in executing the print job such that a conflicting print setting (4-a) from the client device is not used in executing the print job. The resulting merged print setting group would be the same as that shown in FIG. 17.

Figure 19:
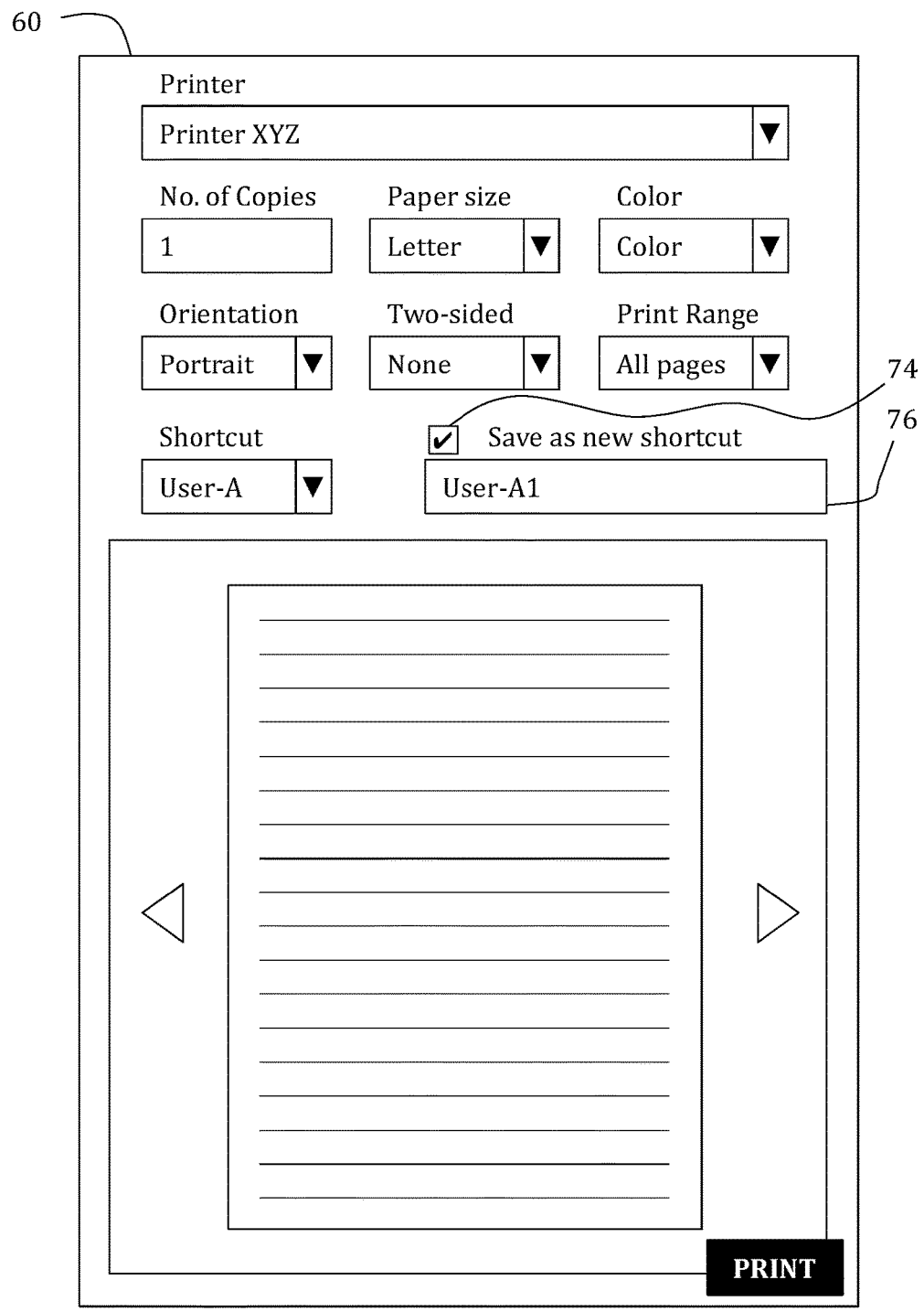
FIG. 19 is a diagram showing an example graphic user interface.
Figure 20:
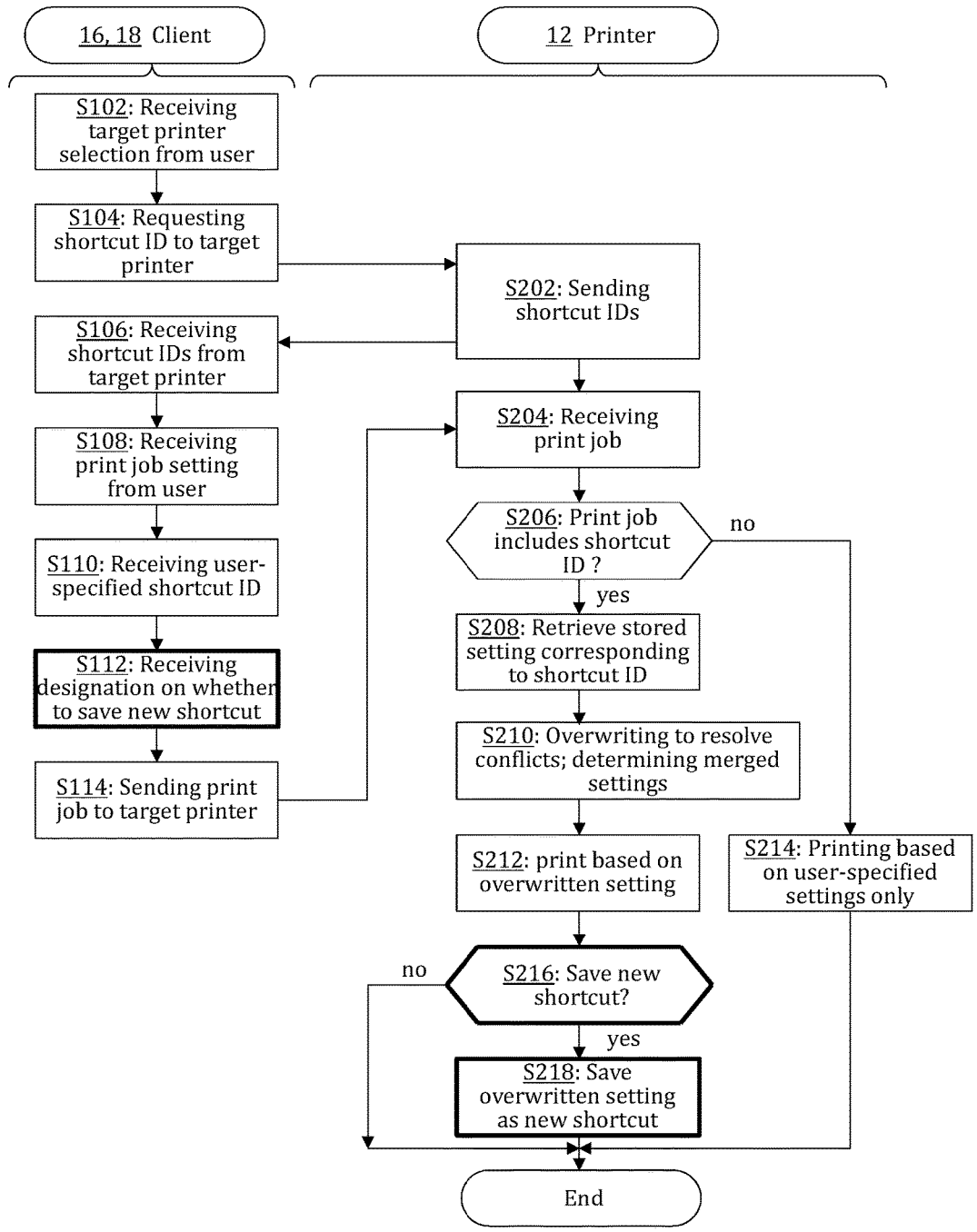
FIG. 20 is a flow diagram showing an example printing method.

FIGS. 19 and 20 show an example graphic user interface and flow diagram for an example printing method that allows the user to save modifications as a new shortcut ID.

FIG. 19 is the same as FIG. 7 except for the addition of save checkbox 74 and new ID input field 76. The user clicks on save checkbox 76 to add or remove a checkmark from the checkbox. The user enters a name for a new shortcut ID in new ID input field 76 by using a touchscreen keyboard, microphone, or other means. For example, a checkmark causes the client device to generate a save designator. The save designator can be a binary flag or other code. As discussed below, the save designator functions as a command for the target printer to save modifications to the predefined print settings associated with the user-specified shortcut ID.

FIG. 20 is the same as FIG. 10 except as described here. S112, S216, and S218 are added. At S112, the user applies a checkmark to save checkbox 76. In effect, the client device receives the user's designation on whether to save a new shortcut. At S114, the print job, which includes the save designator and the name for new shortcut ID, is sent to the target printer. At S216, the target printer determines whether to save a new shortcut for the merged print setting group that was determined at S210. The target printer can make this determination based on the save designator it received from the client device. If no at S216, the process may end. If yes at S216, the process proceeds to S218 where the merged print setting group from S210 is saved by the target printer.

The printer saves the name for new shortcut ID it received from the client device. The printer associates the merged print setting group with the name for new shortcut ID. Thus, when a user later enters the same name in shortcut input field 62, the printer will retrieve the associated print setting group from memory.

In effect, a checkmark in save checkbox 76 will cause the target printer to save the merged print setting group determined at S210 (FIGS. 10 and 14) or S211 (FIG. 16). In FIG. 19 for example, when the user-specified shortcut ID is User-A, a checkmark in save checkbox 76 will cause the target printer to save the merged print setting group of FIG. 11 as a new shortcut ID named User-A1. Referring to FIG. 11, the target printer stores, in response to the save designator, a shortcut comprising the user-specified print setting (e.g., setting 2-a). The shortcut does not comprise a first predefined print setting (2-b) of the designated group which conflicts with the user-specified print setting (2-a). The shortcut comprises a second predefined print setting (e.g., 3-a) of the designated group which does not conflict with the user-specified setting (2-a).

One will appreciate from the above descriptions that the usefulness of a mobile device for printing can be enhanced greatly without encumbering a mobile printing app with excessive input fields and menus. The shortcut ID described herein allows a mobile device user to print with a virtually limitless number of predefined settings that would not normally be available on a lightweight mobile printing app. The mobile device user has the ability to modify predefined print settings associated with the shortcut ID by entering user-specified print settings. The modification is performed by the printer, not by the mobile device, to keep the mobile printing app lightweight. For a more lightweight mobile app, a shortcut ID may be entered by the user without relying on a shortcut list obtained from the printer. In this way, the mobile app does not have to interrogate the printer to obtain a shortcut list. It is also possible for the user to control the modification of predefined settings with priority designators. The modification results in a merged print setting group that is used by the printer for the print job. The utility of the mobile device is enhanced further by allowing the user to save the merged print setting group under a new shortcut ID for future use. Many shortcut IDs may accumulate in the printer over time, so the printer may associate the user with a limited number of shortcut IDs to create an abbreviated list of shortcuts for the user. In this way, the user avoids having to scroll through a long list of shortcut IDs that are useful only to other users.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A printing method comprising:
    storing, by a printer, a plurality of predefined print setting groups;
    receiving, by the printer from a client device, a user-specified shortcut ID for a print job;
    associating, by the printer, the received user-specified shortcut ID to a designated group among the plurality of predefined print setting groups, the designated group comprising a first predefined print setting and a second predefined print setting, the first predefined print setting being a value for a first print setting type, the second predefined print setting being a value for a second print setting type;
    receiving, by the printer from the client device, a user-specified print setting as another value for the first print setting type that is different from and conflicts with the first predefined print setting for the first print setting type and that does not conflict with the second predefined print setting for the second print setting type; and
    executing, by the printer, the print job by using the user-specified print setting for the first print setting type and the second predefined print setting for the second print setting type.

2. The method of claim 1, further comprising:
    before receiving the user-specified shortcut ID, sending a shortcut list to enable the receiving of the user-specified shortcut ID from the client device, the shortcut list being sent by the printer to the client device in response to a request from the client device, the shortcut list including shortcut IDs as members of the shortcut list, each of the shortcut IDs corresponding to a different one of the plurality of predefined print setting groups,
    wherein the associating of the user-specified shortcut ID includes matching the user-specified shortcut ID to a shortcut ID of the designated group.

3. The method of claim 2, further comprising:
    associating, by the printer, a plurality of shortcut IDs with a plurality of users including a first user and a second user, the plurality of shortcut IDs including a first shortcut ID and a second shortcut ID, the first shortcut ID associated with the first user, the second shortcut ID associated with the second user and not associated with the first user;
    before sending the shortcut list, receiving, by the printer from the client device, a user ID corresponding to the first user; and
    determining, by the printer, the members of the shortcut list using the received user ID, wherein the members of the shortcut list includes the first shortcut ID and excludes the second shortcut ID.

4. The method of claim 1, wherein the receiving of the user-specified shortcut ID is not enabled by a transmission, by the printer to the client device, of a shortcut list comprising a plurality of shortcut IDs that correspond to the plurality of predefined print setting groups stored by the printer.

5. The method of claim 1, further comprising:
    receiving, by the printer from the client device, a priority designator, wherein the executing of the print job is performed according to the priority designator, and
    wherein the priority designator:
        prioritizes a predetermined print setting included in the designated group for use in executing the print job such that a conflicting print setting from the client device is not used in executing the print job, or
        prioritizes the user-specified print setting for use in executing the print job such that a conflicting print setting included in the designated group is not used in executing the print job.

6. The method of claim 1, further comprising:
    receiving, by the printer from the client device, a save designator; and storing, by the printer in response to the save designator, a shortcut comprising the user-specified print setting and the second predefined print setting of the designated group.

7. The printing method of claim 1, wherein the client device is configured to display a graphic user interface, the graphic user interface has an input field for the first print setting type and does not have an input field for the second print setting type, and the user-specified print setting is received via a user entry into the input field for the first print setting type.

8. A printer comprising a processor and a memory storing a print software program, the processor executing instructions in the print software program to perform a printing process comprising:
   storing, by the printer, a plurality of predefined print setting groups;
   receiving, by the printer from a client device, a user-specified shortcut ID for a print job;
   associating, by the printer, the received user-specified shortcut ID to a designated group among the plurality of predefined print setting groups, the designated group comprising a first predefined print setting and a second predefined print setting, the first predefined print setting being a value for a first print setting type, the second predefined print setting being a value for a second print setting type;
   receiving, by the printer from the client device, a user-specified print setting as another value for the first print setting type that is different from and conflicts with the first predefined print setting for the first print setting type and that does not conflict with the second predefined print setting for the second print setting type; and
   executing, by the printer, the print job by using the user-specified print setting for the first print setting type and the second predefined print setting for the second print setting type.

9. The printer of claim 8, wherein the printing process performed by the printer further comprises:
   before receiving the user-specified shortcut ID, sending a shortcut list to enable the receiving of the user-specified shortcut ID from the client device, the shortcut list being sent by the printer to the client device in response to a request from the client device, the shortcut list including shortcut IDs as members of the shortcut list, each of the shortcut IDs corresponding to a different one of the plurality of predefined print setting groups, and
   wherein the associating of the user-specified shortcut ID includes matching the user-specified shortcut ID to a shortcut ID of the designated group.

10. The printer of claim 9, wherein the printing process performed by the printer further comprises:
    associating, by the printer, a plurality of shortcut IDs with a plurality of users including a first user and a second user, the plurality of shortcut IDs including a first shortcut ID and a second shortcut ID, the first shortcut ID associated with the first user, the second shortcut ID associated with the second user and not associated with the first user;
    before sending the shortcut list, receiving, by the printer from the client device, a user ID corresponding to the first user; and
    determining, by the printer, the members of the shortcut list using the received user ID, wherein the members of the shortcut list includes the first shortcut ID and excludes the second shortcut ID.

11. The printer of claim 8, wherein the receiving of the user-specified shortcut ID is not enabled by a transmission, by the printer to the client device, of a shortcut list comprising a plurality of shortcut IDs that correspond to the plurality of predefined print setting groups stored by the printer.

12. The printer of claim 8, wherein the printing process performed by the printer further comprises:
    receiving, by the printer from the client device, a priority designator, wherein the executing of the print job is performed according to the priority designator, and
    wherein the priority designator:
       prioritizes a predetermined print setting included in the designated group for use in executing the print job such that a conflicting print setting from the client device is not used in executing the print job, or
       prioritizes the user-specified print setting for use in executing the print job such that a conflicting print setting included in the designated group is not used in executing the print job.

13. The printer of claim 8, wherein the printing process performed by the printer further comprises:
    receiving, by the printer from the client device, a save designator; and
    storing, by the printer in response to the save designator, a shortcut comprising the user-specified print setting and the second predefined print setting of the designated group.

14. The printer of claim 8, wherein the client device is configured to display a graphic user interface, the graphic user interface has an input field for the first print setting type and does not have an input field for the second print setting type, and the user-specified print setting is received via a user entry into an input field for the first print setting type.

15. A non-transitory computer readable medium having stored thereon computer readable instructions that, when executed by one or more computer processors of a printer, cause the printer to perform a printing process comprising:
    storing, by the printer, a plurality of predefined print setting groups;
    receiving, by the printer from a client device, a user-specified shortcut ID for a print job;
    associating, by the printer, the received user-specified shortcut ID to a designated group among the plurality of predefined print setting groups, the designated group comprising a first predefined print setting and a second predefined print setting, the first predefined print setting being a value for a first print setting type, the second predefined print setting being a value for a second print setting type;
    receiving, by the printer from the client device, a user-specified print setting as another value for the first print setting type that is different from and conflicts with the first predefined print setting for the first print setting type and that does not conflict with the second predefined print setting for the second print setting type; and
    executing, by the printer, the print job by using the user-specified print setting and the second predefined print setting of the designated group.

16. The non-transitory computer readable medium of claim 15, wherein the printing process performed by the printer further comprises:
    before receiving the user-specified shortcut ID, sending a shortcut list to enable the receiving of the user-specified shortcut ID from the client device, the shortcut list being sent by the printer to the client device in response to a request from the client device, the shortcut list including shortcut IDs as members of the shortcut list, each of the shortcut IDs corresponding to a different one of the plurality of predefined print setting groups, and wherein the associating of the user-specified shortcut ID includes matching the user-specified shortcut ID to a shortcut ID of the designated group.

17. The non-transitory computer readable medium of claim 16, wherein the printing process performed by the printer further comprises:

associating, by the printer, a plurality of shortcut IDs with a plurality of users including a first user and a second user, the plurality of shortcut IDs including a first shortcut ID and a second shortcut ID, the first shortcut ID associated with the first user, the second shortcut ID associated with the second user and not associated with the first user;

before sending the shortcut list, receiving, by the printer from the client device, a user ID corresponding to the first user; and determining, by the printer, the members of the shortcut list using the received user ID, wherein the members of the shortcut list includes the first shortcut ID and excludes the second shortcut ID.

18. The non-transitory computer readable medium of claim 15, wherein the receiving of the user-specified shortcut ID is not enabled by a transmission, by the printer to the client device, of a shortcut list comprising a plurality of shortcut IDs that correspond to the plurality of predefined print setting groups stored by the printer.

19. The non-transitory computer readable medium of claim 15, wherein the printing process performed by the printer further comprises:

receiving, by the printer from the client device, a priority designator, wherein the executing of the print job is performed according to the priority designator, and wherein the priority designator:
prioritizes a predetermined print setting included in the designated group for use in executing the print job such that a conflicting print setting from the client device is not used in executing the print job, or
prioritizes the user-specified print setting for use in executing the print job such that a conflicting print setting included in the designated group is not used in executing the print job.

20. The non-transitory computer readable medium of claim 15, wherein the printing process performed by the printer further comprises:

receiving, by the printer from the client device, a save designator; and storing, by the printer in response to the save designator, a shortcut comprising the user-specified print setting and the second predefined print setting of the designated group.

21. The non-transitory computer readable medium of claim 15, wherein the client device is configured to display a graphic user interface, the graphic user interface has an input field for the first print setting type and does not have an input field for the second print setting type, and the user-specified print setting is received via a user entry into an input field for the first print setting type.

* * * * *